US012133303B2

(12) United States Patent
Lee et al.

(10) Patent No.: US 12,133,303 B2
(45) Date of Patent: Oct. 29, 2024

(54) LIGHT EMITTING DEVICE AND LAMP ASSEMBLY

(71) Applicant: TAIWAN OASIS TECHNOLOGY CO., LTD., New Taipei (TW)

(72) Inventors: Ming-Shun Lee, New Taipei (TW); Wei-Long Lee, New Taipei (TW); Shih-Meng Liao, New Taipei (TW); Chih-Wei Liu, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/374,046

(22) Filed: Sep. 28, 2023

(65) Prior Publication Data

US 2024/0032169 A1 Jan. 25, 2024

Related U.S. Application Data

(63) Continuation of application No. 17/504,646, filed on Oct. 19, 2021, now Pat. No. 11,812,526.

(51) Int. Cl.
*H05B 45/20* (2020.01)
*H05B 45/34* (2020.01)

(52) U.S. Cl.
CPC ............. *H05B 45/20* (2020.01); *H05B 45/34* (2020.01)

(58) Field of Classification Search
CPC ................................ H05B 45/20; H05B 45/34
See application file for complete search history.

(56) References Cited

U.S. PATENT DOCUMENTS 10,624,166 B1 * 4/2020 Shao ..................... F21V 23/001
2018/0172226 A1 * 6/2018 Zhao ......................... F21S 4/10

* cited by examiner

*Primary Examiner* — Daniel D Chang
(74) *Attorney, Agent, or Firm* — Demian K. Jackson; Jackson IPG PLLC

(57) ABSTRACT

A light emitting device controls its mixed CCT by the configuration of at least one light emitter, at least one diode and at least two power distribution components. The present disclosure is mainly based on the hardware design of diode and jumper, which effectively replaces the resistors and manual switches of the conventional light emitting device with diodes, wherein the resistors and the manual switches of the conventional light emitting device cause voltage instability and other problems. The present disclosure can achieve the demand for miniaturization of the light emitting device by plugging the jumper into pins, and further can achieve the main advantages of stabilizing the voltage of the overall light emitting device, thereby stabilizing the luminous performance of the overall light emitting device, and emitting the mixed light with the required CCT. The present disclosure also illustrates a lamp assembly using the aforementioned light emitting device.

3 Claims, 8 Drawing Sheets

LIGHT EMITTING DEVICE AND LAMP ASSEMBLY

CROSS REFERENCE

The present disclosure is a Continuation Application which claims the priority of U.S. patent application Ser. No. 17/504,646 dated on Oct. 19, 2021.

BACKGROUND

1. Technical Field

The present disclosure relates to a light emitting device and a lamp assembly, in particular to a light emitting device that controls the color temperature of the light emitting diode through the configuration of diodes, and to a lamp assembly made of the light emitting device.

2. Description of Related Art

In recent years, due to the rapid development of light emitting diode (LED), such light-emitting technology has been widely used in lighting and back lighting source, and because the life of the LED is longer than that of the incandescent bulb, the power consumption of the LED less than that of the incandescent bulb, and the LED has the advantages of lightness, thinness, short size, and good color saturation, the LED has become the most developing light source.

Take the white light produced by the LED as an example. The white light is a combination of multiple types of lights with different wavelengths. One way to characterize the white light is to use a color temperature. The so-called color temperature refers to the color temperature of the black body metal radiation light. To be specific, the color temperature is the spectral components contained in various light sources. A standard black body metal, such as iron or tungsten, is used to continuously heat the standard black body metal. In the heating process, the black body metal with different temperatures will emit the lights with different colors. When the temperature gradually rises, the color of the light will continue to change. This color light that changes with temperature is the spectral composition of the standard black body radiation, and the spectral composition also varies with temperature, so the color temperature is the color temperature of the radiant light. Simply put, the color temperature means the color of the light in the white light, and the correlated color temperature (CCT) refers to the specification of the color appearance of the light emitted by the light emitting device. The CCT level of the light emitting device usually refers to the warmth or coolness of the light emitting device, the CCT level basically measures whether the color of the light emitted by the light emitting device is cool white or warm white. When the CCT rating value is lower than 3200K, the light emitting device is considered a warm light source, or the white of the light is the warm white (yellow-white to red), and the light emitting device with the CCT rating value lager than 4000K are recognized as the cold light source, or the white of the light is cold white (blue-white).

With the increasing usage of LEDs, including residential buildings, commercial buildings, hospitals or educational institutions, etc., people expect LEDs to have various CCT rating values, and hope that LEDs can emit different colors. Therefore, a lamp assembly with LEDs that can easily change the CCT rating value is the most advantageous product. In order to achieve the above purpose, the "Manually controllable LED correlated color temperature light fixture" of U.S. patent Ser. No. 10/091,855B2 (Document 1) was developed to solve the above problems. This patent is mainly related to a lamp assembly with at least two LEDs, each LED with different CCTs, combining the CCT switch components and resistors in the circuit, and manually switching the circuit to select a specific LED light source or LED combination, the lamp assembly presents different the light with different CCTs.

The circuit in Document 1 uses the resistors to mix the light emissions of two LEDs with different CCTs into a mixed light with a mixed CCT. However, the resistors usually have an error value of ±1% to ±5%, which causes the voltage is unstable and the luminous efficacy of the LED will be unstable, so the aforementioned mixed CCT will also be unstable. In addition, the CCT switch assembly of Document 1 needs to be toggled by hand and the size of the hand must be considered. Therefore, it cannot be miniaturized and is not conducive to the progress of product miniaturization. Therefore, how to use innovative hardware design to effectively prevent conventional light emitting device from using switch devices or resistive structures to adjust the color temperature, which may easily lead to problems such as instability of the voltage and current of the light emitting device, is an issue which the developers and related researchers in the field need to continue to work hard to overcome and solve.

SUMMARY

The main purpose of the present disclosure is to provide a light emitting device that has a stable voltage when it reaches a mixed CCT, and can be miniaturized. The present disclosure uses diodes to control the mixed CCT of the light emitting device, and that is the present disclosure effectively replaces the resistors of the conventional light emitting device with the diode, stabilizes the voltage of the light emitting device and stabilizes the mixed CCT, thus overcoming the unstable mixed CCT problem of the conventional light emitting device. At the same time, the miniaturization of the light emitting device is achieved by plugging the jumper into the pins. The aforementioned diodes are defined differently from the LED. The diode referred to in the present disclosure is an electronic element with two asymmetric electrodes, which cannot emit light and has a rectification or voltage regulation function, so it is not the same as the LED.

To achieve the above objective of the present disclosure, a light emitting device is provided, which comprises: a first light emitter and a second light emitter, wherein the first light emitter and the second light emitter emit lights with different color temperatures or different wavelength; and a control circuit, comprising a power distribution device, a first voltage regulator and a second voltage regulator; wherein the power distribution device comprises at least two power distribution components, and each of the power distribution components comprises two electrodes disposed independently; the at least two power distribution components are respectively a first power distribution component and a second power distribution component, one end of the first voltage regulator is electrically connected to the first light emitter, other one end of the first voltage regulator is electrically connected to the second power distribution component, one end of the second voltage regulator is electrically connected to the second power distribution component, and other one end of the second voltage regulator is electrically connected to second light emitter; wherein the first power distribution component is electrically connected to the first light emitter, and each of the first voltage regulator and the second voltage regulator has at least one diode disposed therein.

According to the light emitting device, a power output end of the first voltage regulator is electrically connected to the first light emitter, and a power input end of the first voltage regulator is electrically connected to the second power distribution component; a power output end of the second voltage regulator is electrically connected to the second light emitter, and a power input end of the second voltage regulator is electrically connected to the second power distribution component.

According to the light emitting device, the light emitting device further comprises a power supplier, the power input end of the first voltage regulator, the power input end of the second voltage regulator and the second power distribution component are electrically connected to a connection point; the one electrode of first power distribution component and the one electrode of the second power distribution component are electrically connected to the power supplier; the other one electrode of first power distribution component and the other one electrode of the second power distribution component are respectively electrically connected to the first light emitter and the connection point.

According to the light emitting device, light emitting device further comprises a jumper, the jumper is configured to have a connection wire and two terminals disposed at two ends of the connection wire, when the two terminals of the jumper are respectively electrically connected to the two electrodes of the power distribution component, the jumper transmits the power provided by the power supplier to the first light emitter and/or the second light emitter.

According to the light emitting device, when the two electrodes of the first power distribution component are electrically connected to each other via the jumper, the power provided by the power supplier is transmitted to the first light emitter.

According to the light emitting device, the two electrodes of the second power distribution component are electrically connected to each other via the jumper, a supply current of the power provided by the power supplier is divided at the connection point, wherein after one divided current passes the first voltage regulator, a voltage drop is generated between the connection point and the first voltage regulator, and the one divided current makes the first light emitter emit a first luminous flux, and after other one divided current passes the second voltage regulator, another one voltage drop is generated between the connection point and the second voltage regulator, and the other one divided current makes the second light emitter emit a second luminous flux.

According to the light emitting device, the control circuit further comprises a third power distribution component, the third power distribution component also comprises two electrodes disposed independently, wherein the one electrode is electrically connected to the power supplier, the other one electrode is electrically connected to the second light emitter, when the two electrodes of the third power distribution component are electrically connected to each other via the jumper, the power provided by the power supplier is transmitted to the second light emitter or a power input end of the second voltage regulator.

According to the light emitting device, the first light emitter and the second light emitter are light emitting diodes (LEDs).

According to the light emitting device, the first light emitter and/or the second light emitter comprises one light emitting diode (LED) or a plurality of light emitting diodes (LEDs) but does not comprise any one of resistors According to the light emitting device, the first voltage regulator and/or the second voltage regulator is formed by merely one diode or serially connected diodes.

The present disclosure further provides another embodiment of the light emitting device, and the light emitting device comprises: a first light emitter and a second light emitter, wherein the first light emitter and the second light emitter emit lights with different color temperatures or different wavelength; and a control circuit, comprising a power distribution device and a first voltage regulator; wherein the power distribution device comprises at least two power distribution components, and each of the power distribution components comprises two electrodes disposed independently; the at least two power distribution components are respectively a first power distribution component and a second power distribution component, the first power distribution component is electrically connected to the first light emitter, a power input end of the first voltage regulator is electrically connected to the first power distribution component via a first voltage drop generation point, and a power output end of the first voltage regulator is electrically connected to the second light emitter; wherein the second power distribution component is electrically connected to second light emitter, and the first voltage regulator has at least one diode disposed therein.

According to the light emitting device, the light emitting device further comprises a jumper, when the two electrodes of the first power distribution component are electrically connected to each other via the jumper, a supply current of the power provided by the power supplier is divided at the first voltage drop generation point into a first divided current and a second divided current, wherein the first divided current directly flows into the first light emitter to make the first light emitter emit a first luminous flux, and after the second divided current passes the first voltage regulator, one voltage drop is generated between the first voltage drop generation point and the first voltage regulator, and the second divided current to make the second light emitter emit a second luminous flux; wherein the first luminous flux of the first light emitter and the second luminous flux of the second light emitter are mixed to form a first mixed correlated color temperature.

According to the light emitting device, the control circuit further comprises a second voltage regulator, a power input end of the second voltage regulator is electrically connected to the second power distribution component via a second voltage drop generation point, a power output end of the second voltage regulator is electrically connected to the first light emitter, the second power distribution component is electrically connected to the second light emitter, and the second voltage regulator has at least one diode disposed therein.

According to the light emitting device, when the two electrodes of the second power distribution component are electrically connected to each other via the jumper, the supply current of the power provided by the power supplier is divided at the second voltage drop generation point into a third divided current and a fourth divided current, wherein the third divided current directly flows into the second light emitter to make the second light emitter emit a third luminous flux, and after the fourth divided current passes the second voltage regulator, another one voltage drop is generated between the second voltage drop generation point and the second voltage regulator, and the fourth divided current to make the first light emitter emit a fourth luminous flux; wherein the fourth luminous flux of the first light emitter and the third luminous flux of the second light emitter are mixed to form a second mixed correlated color temperature, and the first mixed CCT is different from the second mixed CCT.

Since the CCT is related to the luminous flux, the present disclosure further provides a light emitting device which is able to adjust the luminous flux, and the light emitting device comprises: a first light emitter; and a control circuit, comprising a power distribution device and a first voltage regulator; wherein the power distribution device comprises at least two power distribution components, and each of the power distribution components comprises two electrodes disposed independently; the at least two power distribution components are respectively a first power distribution component and a second power distribution component, the first power distribution component is electrically connected to the first light emitter, one end of the first voltage regulator is electrically connected to the first light emitter, and other one end of the first voltage regulator is electrically connected to the second power distribution component; wherein the first power distribution component is electrically connected to the first light emitter, and the first voltage regulator has at least one diode disposed therein.

According to the light emitting device, a power output end of first voltage regulator is electrically connected to the first light emitter, and a power input end of the first voltage regulator is electrically connected to the second power distribution component.

To achieve the above objective, the present disclosure further provides a lamp assembly comprising one of the above light emitting devices and a mask, wherein the mask masks the light emitting device.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

In order to facilitate the examiner to understand the technical features, the contents and the advantages of the present disclosure, as well as the efficacy that can be reached by the present disclosure, the present disclosure will now be described in detail with the drawings and the form of expression of the embodiment. The drawings used are only for illustration and support of the specification, and hence are not necessarily accurate in scale and precise in configuration after implementation of the present disclosure. Therefore, it should not be interpreted based upon the scale and the configuration on the drawings to confine the scope of the rights claimed on the practical implementation of the present disclosure.

Figure 1:
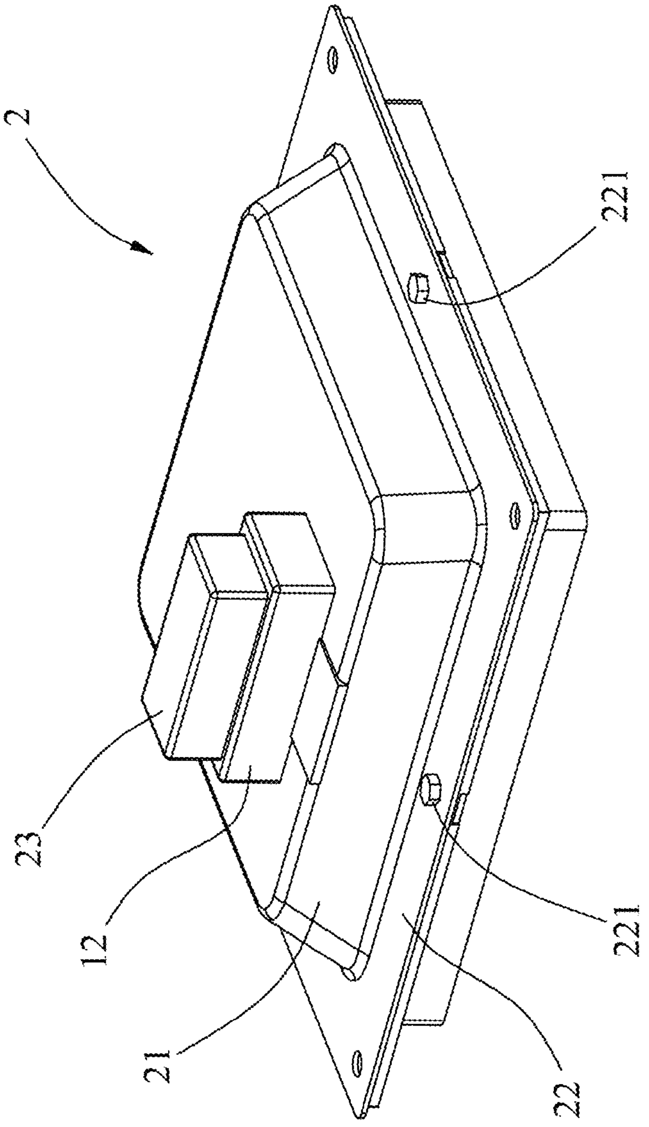
FIG. 1 is a three-dimensional view of an overall structure of a lamp assembly according to one embodiment of the present disclosure.
Figure 2:
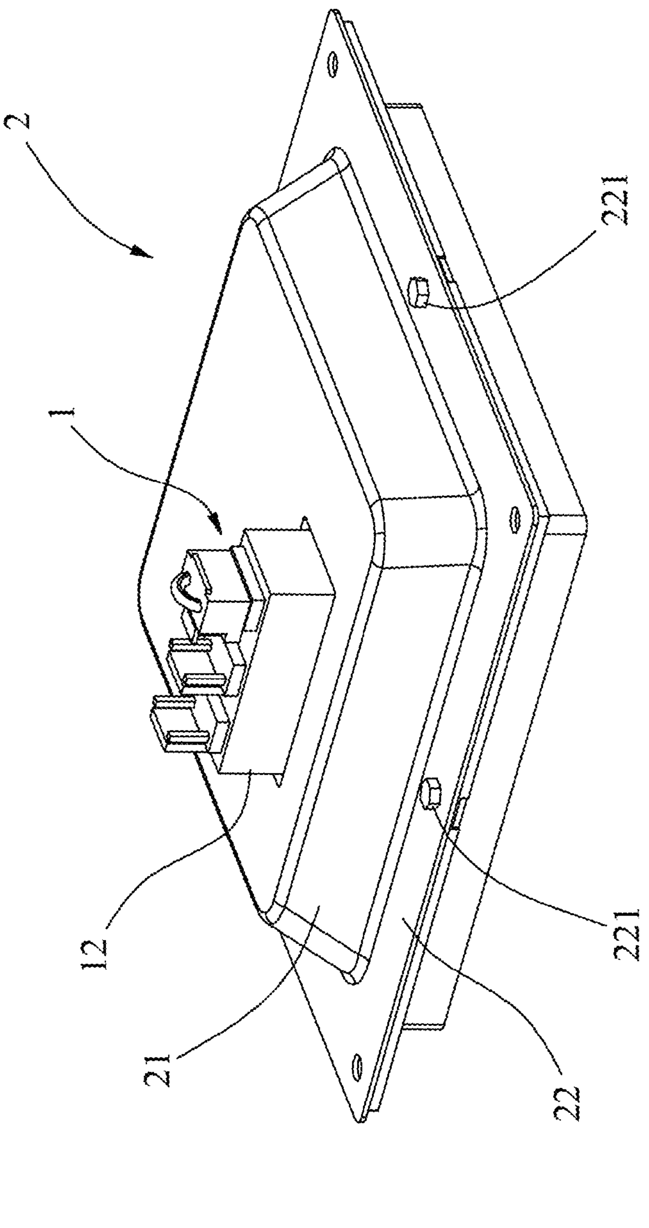
FIG. 2 is another one three-dimensional view of an overall structure of a lamp assembly according to one embodiment of the present disclosure.

Refer to FIGS. 1 and 2, which are three-dimensional views of an overall structure of a lamp assembly according to one embodiment of the present disclosure. The lamp assembly (2) comprises a light emitting device (1), a mask (21), a hollow plate (22) and a cover (23). The control circuit (12) and the fixing parts (221) in drawings are illustrated later, and other components in the drawings are illustrated as follows firstly.

Figure 3:
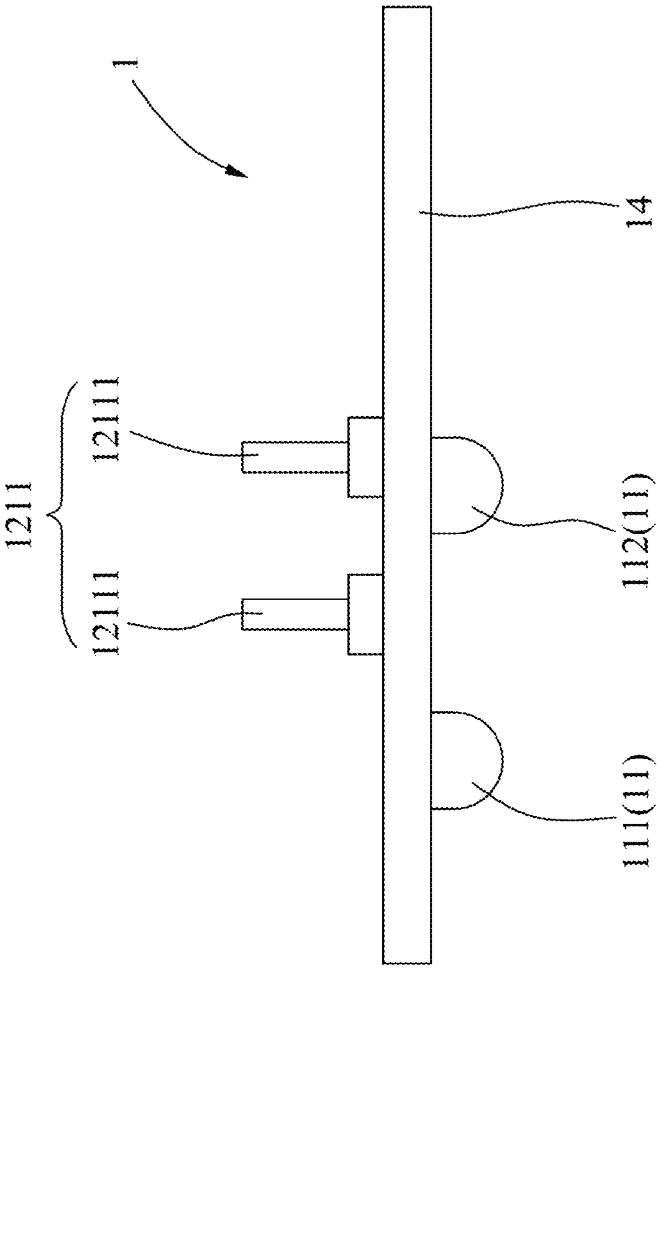
FIG. 3 is a section view of an overall structure of a light emitting device according to one embodiment of the present disclosure.
Figure 4:
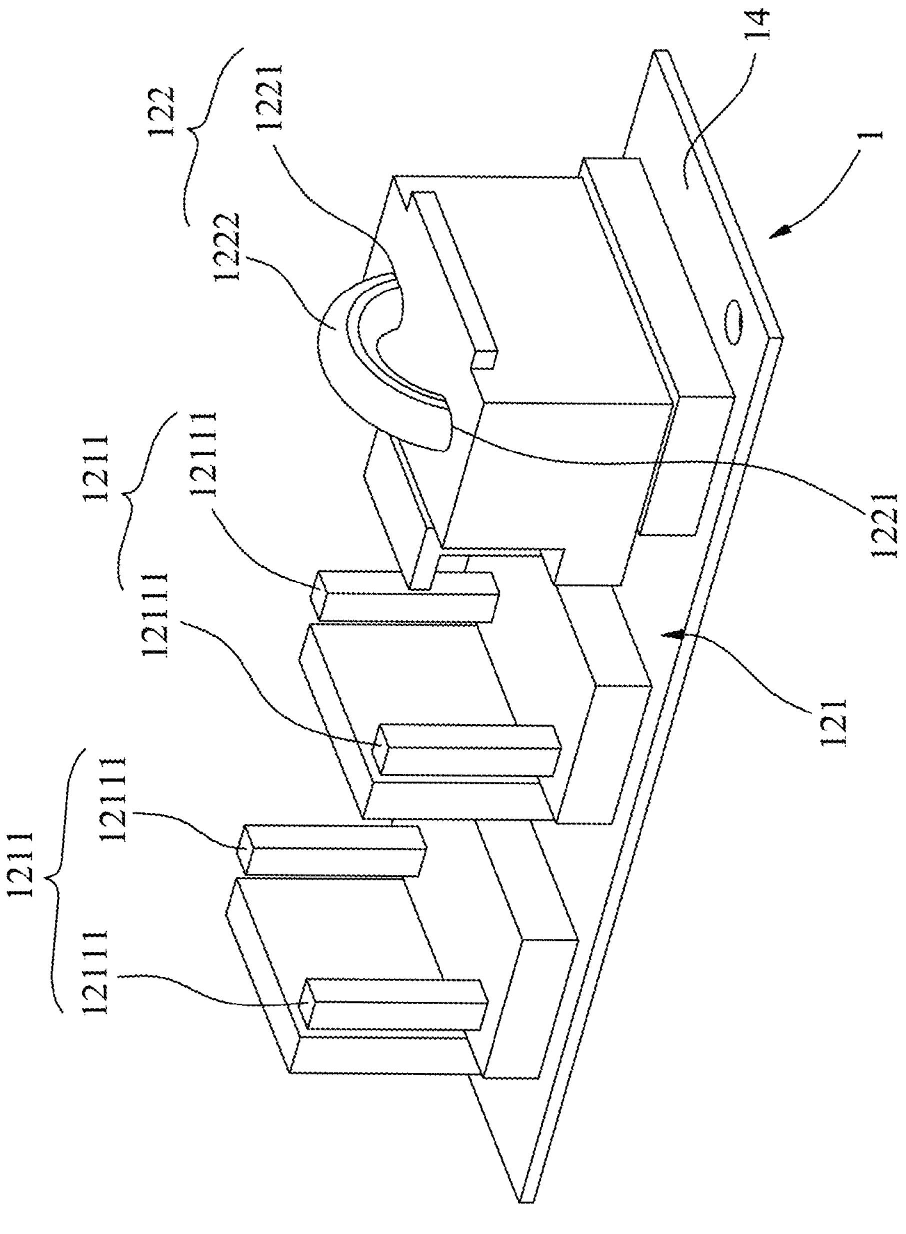
FIG. 4 is schematic diagram showing a jumper is plugged to one of power distribution components of a light emitting device according to one embodiment of the present disclosure.
Figure 5:
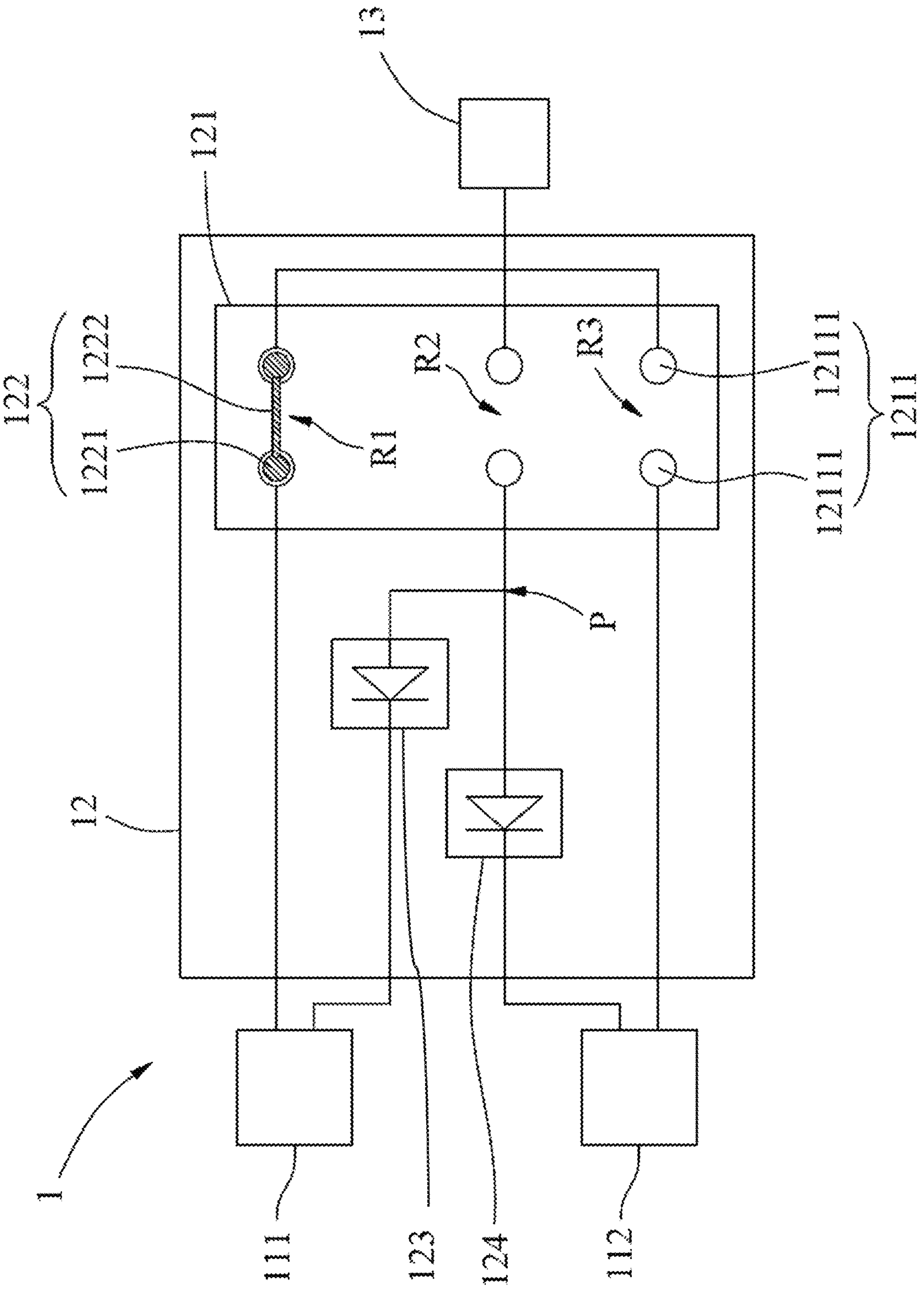
FIG. 5 is a circuit connection diagram of a light emitting device according to one embodiment of the present disclosure.

Refer to FIG. 3 to FIG. 5, wherein the light emitting device (1) comprises at least one light emitter (11), a control circuit (12), a power supplier (13) and a circuit board (14). For example, the light emitting device (1) in FIG. 5 has two light emitters (11). For example, the control circuit (12) and the power supplier (13) are disposed on one surface of the circuit board (14). The at least two light emitters (11) are arranged on the other one surface of the circuit board (14). The power supplier (13) is, for example, an AC/DC converter, and the power supplier (13) is electrically connected to an external power source (not shown in the drawings). The external power source is, for example, supply mains, and can transmit the electric energy thereof to the two light emitters (11) and the control circuit (12), wherein the shape of the circuit board (14) is square, rectangular, circular, elliptical, or irregular shape, and in one embodiment of the present disclosure, the circuit board (14) has a rectangular shape.

In addition, the two light emitters (11) on the one surface of the circuit board (14) are a first light emitter (111) and a second light emitter (112) that can emit different CCT lights, respectively. For example, the first light emitter (111) is an LED that emits a light with a first CCT (for example, 5000K), and the second light emitter (112) is an LED that emits a light with a second CCT (for example, 3000K). Further, in another one embodiment, each of the first light emitter (111) and the second light emitter (112) is an LED assembly which comprises a plurality of LEDs but does not comprise any one of resistors. The first CCT is different from the second CCT. The light emitting device (1) of an embodiment of the present disclosure can mix the light emitted by the first light emitter (111) with a CCT of 5000K and the light emitted by the second light emitter (112) with a CCT of 3000K into a light with a mixed CCT, for example, the mixed CCT is 4000K. However, it must be noted that the CCT values of the light emitters (11), the number of CCTs and the mixed CCT value mentioned above are for the convenience of explanation, and not limited to the present disclosure, and those skilled in the art should know that they can be changed. The CCT values of the light emitters (11), the number of the CCTs and the mixed CCT value will not affect the actual implementation of the present disclosure.

The control circuit (12) disposed on the other one surface of the circuit board (14) opposite to the first light emitters (111) and the second light emitter (112) comprises at least one power distribution device (121), a jumper (122), a first voltage regulator (123) and a second voltage regulator (124). The power distribution device (121) comprises a plurality of power distribution components (1211), for example, three power distribution components (1211). Each of the power distribution components (1211) comprises two independently disposed (non-electrically connected) electrodes (also called pins) (12111), and the jumper (122) is provided with a connection wire (1222) and two terminals (1221) at both ends of the connection wire (1222). When the jumper (122) is plugged into one of the power distribution components (1211), the two terminals (1221) respectively electrically contact with the two electrodes (12111) of the power distribution component (1211). Since the two terminals (1221) are electrically connected to each other by the connection wire (1222), the two electrodes (12111) will also be electrically connected to each other. When the power distribution component (1211) is powered on, the first light emitter (111) and/or the second light emitter (112) can emit the lights.

Refer to FIG. 5, and when the jumper (122) is clamped with tweezers and the jumper (122) is set in a first position (R1), among the three power distribution components (1211), the two electrodes (12111) of the power distribution component (1211) disposed at the top (i.e. the first power distribution component) are electrically connected to each other. Because the power distribution component (1211) at the top is directly electrically connected to the first light emitter (111), the power provided by the power supplier (13) can be directly transferred to the first light emitter (111) via the power distribution component (1211), so that the first light emitter (111) can emit the light with a CCT of 5000K and a first original luminous flux. Similarly, when the jumper (122) is set in a third position (R3), the two electrodes of the power distribution component (1211) at the bottom (i.e. the third power distribution component) among the three power distribution components (1211) are electrically connected to each other. Since the power distribution component (1211) at the bottom is directly electrically connected to the second light emitter (112), the power provided by the power supplier (13) can directly pass through the power distribution component (1211) at the bottom to the second light emitter (112), the second light emitter (112) can emit light with a CCT of 3000K and a second original luminous flux. The aforementioned first original luminous flux refers to the luminous flux of light emitted by the first light emitter (111) at a specific current, and the second original luminous flux refers to the luminous flux of light emitted by the second light emitter (112) at the specific current. When the jumper (122) is set at the first position (R1) and the third position (R3) respectively, a specific voltage received by the first light emitter (111) and the second light emitter (112) can be regarded as a supply voltage provided by the power supplier (13), and the specific currents of the first light emitter (111) and the second light emitter (112) respectively depend on the numbers of LED included in the light emitter (111) and the second light emitter (112), wherein each of the first light emitter (111) and the second light emitter (112) is an LED assembly which comprises a plurality of LEDs but does not comprises any one of resistors. Since the supplied voltage is determined, the specific currents of the first light emitter (111) and the second light emitter (112) are determined, and that is, when the specific voltage is stable, the luminous fluxes of the first light emitter (111) and the second light emitter (112) are stable.

It is noted that, in another one implementation, a power input end of the second voltage regulator (124) is electrically connected to the third power distribution component, rather than the second power distribution component (the distribution component (1211) at the middle) as shown in FIG. 5, and a power output end of the second voltage regulator (124) is electrically connected to the second light emitter (112). When the jumper (122) is set in the third position (R3), the two electrodes of the power distribution component (1211) at the bottom (i.e. the third power distribution component) of the three power distribution components (1211) are electrically connected to each other, and the power provided by the power supplier (13) is transmitted to the power input end of the second voltage regulator (124), and then transferred to the second light emitter (112) via the power output end of the second voltage regulator (124). Since the supplied voltage is regulated by the second voltage regulator (124), the specific current compared to the condition without passing the second voltage regulator (124) can be decreased, and at this time, the second light emitter (112) can emit light with a CCT of 3000K and the luminous flux less than the second original luminous flux.

Still refer back to FIG. 5, in the embodiment of FIG. 5, one end of the first voltage regulator (123) is electrically connected to the first light emitter (111), and the other one end is electrically connected to the power distribution component (1211) in the middle (i.e. the second power distribution component) of the three power distribution components (1211) and the second voltage regulator (124). The first voltage regulator (123) is composed of at least one of diodes, the power output end of the diode is electrically connected to the first light emitter (111), and the power input end of the diode is electrically connected to the power distribution component (1211) in the middle and the second voltage regulator (124). In particular, the definition of the aforementioned diode is different from that of LED. The diode referred to in the present disclosure is an electronic component with two asymmetrical conductance electrodes, and it cannot emit the light but has the function of rectification or voltage regulation. Therefore, the diode is different from LED.

One end of the second voltage regulator (124) is electrically connected to the power distribution component (1211) in the middle and the first voltage regulator (123), and the other one end of the second voltage regulator (124) is electrically connected to the second light emitter (112). The second voltage regulator (124) is composed of at least two serially connected diodes, and the output end of the serially connected diode is electrically connected to the second light emitter (112), and power input end of the series-connected diode is electrically connected to the power distribution component (1211) in the middle and the first voltage regulator (123). It is particularly noted that, in other words, the first voltage regulator (123) and/or the second voltage regulator (124) can be formed by merely a diode or multiple serial connected diodes.

When the jumper (122) is set in a second position (R2), the two electrodes of the power distribution component (1211) in the middle of the three power distribution components (1211) are electrically connected to each other, a supply voltage transmitted from the power supplier (13) will be transferred at a connection point (P), wherein the power input end of the first voltage regulator (123), the second power distribution component and the power input end of the second voltage regulator (124) intersect at the connection point (P). The corresponding supply current of the power supplier (13) will be divided at the connection point (P). After one of the divided current passes through the diode of the first voltage regulator (123), there is a voltage drop of the diode, and the voltage after the voltage drop is transferred to the first light emitter (111) and the divided current is less than the current of the condition without passing the diode, so that the first light emitter (111) emits light with a CCT of 5000K and the first luminous flux less than the first original luminous flux. That is, there is a voltage drop generated between the connection point (P) and the first voltage regulator (123). For example, the supply voltage with a voltage drop of about 5%, at this time, the first luminous flux has a steep drop of approximately one-half of that (i.e. the first original luminous flux) when there is no voltage drop. After another one divided current passes through the second voltage regulator (124), there is also a voltage drop. The voltage after the voltage drop is transferred to the second light emitter (112) and the other one divided current is less than the current of the condition without passing the diode, so that the second light emitter (112) emits the light with a CCT of 3000K and the second luminous flux less than the second original luminous flux. That is, there is a voltage drop generated between the connection point (P) and the second voltage regulator (124). For example, the supply voltage with a voltage drop of about 5%, at this time, the second luminous flux has a steep drop of approximately one-half of that (i.e. the second original luminous flux) when there is no voltage drop. Therefore, the light with the first luminous flux and the light with the second luminous flux are mixed into the light with a CCT of 4000K and the total luminous flux of the aforementioned first luminous flux and the aforementioned second luminous flux.

Of course, the third power distribution component may not be provided in the present disclosure, and similarly, the light emitting device (1) that is able to obtain the mixed light with a CCT of 4000K can be achieved.

In particular, the present disclosure replaces the resistors for voltage regulating of the conventional light emitting device with a diode to stabilize the voltage applying to the light emitter of the light emitting device (i.e. stabilizing the current passing the light emitter) and thereby stabilize the mixed CCT, thus overcoming the problem of instability of the mixed CCT of the conventional light emitting device. At the same time, the miniaturization of the light emitting device is achieved by plugging only the jumper into the pins.

It is particularly noted that the first light emitter (111) and the second light emitter (112) of the present disclosure can also emit light of different wavelengths respectively.

Figure 6:
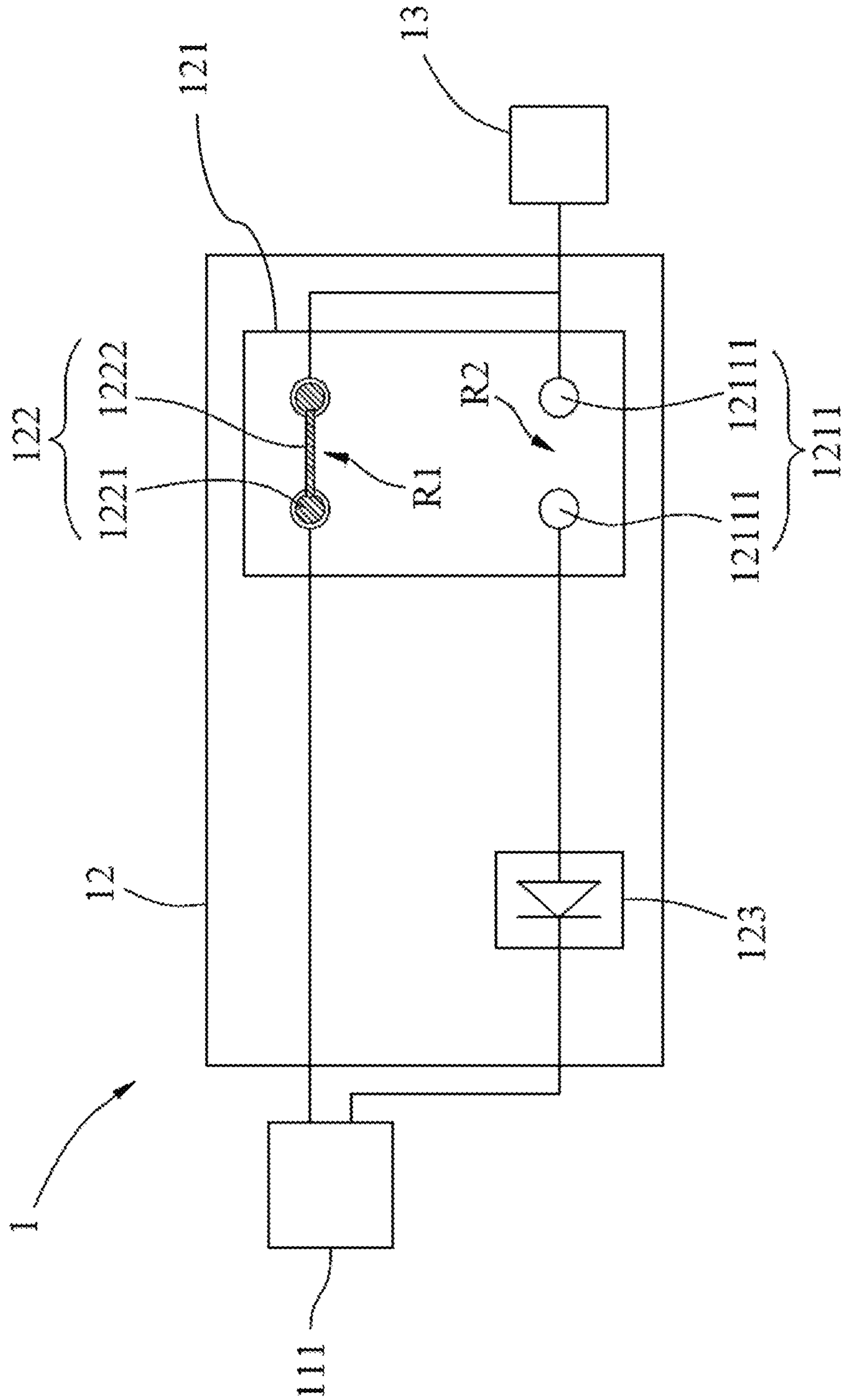
FIG. 6 is a circuit connection diagram of a light emitting device according to another one embodiment of the present disclosure.

Refer to FIG. 6, and in such specific embodiment, the light emitting device (1) can have only one light emitter. For example, the light emitting device (1) at least comprises: the first light emitter (111); and, the control circuit (12) comprising the power distribution device (121) and the first voltage regulator (123); wherein, the power distribution device (121) comprises at least two power distribution components (1211), and each of the power distribution components (1211) comprises two electrodes (12111) disposed independently; the at least two power distribution components (1211) are the first power distribution component and the second power distribution component, and one end of the first voltage regulator (123) (for example, the power output end of the diode) is electrically connected to the first light emitter (111), and the other one end (for example, the power input end of the diode) is electrically connected to the second power distribution component; and the first voltage regulator (123) is provided with at least one diode. The embodiment in FIG. 6 can be used to select or adjust the luminous flux emitted by the first light emitter (111). For example, when the jumper (122) is clamped with tweezers and the jumper (122) is set in the first position (R1), the two electrodes of the power distribution component (1211) located at the top (i.e. the first power distribution component) of the two power distribution components (1211) are electrically connected to each other. Since the power distribution component (1211) at the top (i.e. the first power distribution component) is directly electrically connected to the first light emitter (111), the power (i.e. the supplied voltage and supplied current) provided by the power supplier (13) can be directly transmitted to the first light emitter (111) via the power distribution component (1211), which makes the first light emitter (111) emit the light with the first original luminous flux. When the jumper (122) is set in the second position (R2), the two electrodes of the power distribution component (1211) located bottom (the second power distribution component) are electrically connected to each other. After the supply voltage delivered by the power supplier (13) passes through the diode of the first voltage regulator (123), there is a voltage drop on across the diode, and the voltage after the voltage drop is transferred to the first light emitter (111) and the current passing the first light emitter (111) will be less than that without voltage drop. For example, the supply voltage with a voltage drop of about 5%, at this time, the first luminous flux has a steep drop of about one-half of that (i.e. the first original luminous flux) when there is no voltage drop. Therefore, according to whether the jumper (122) is set in the first position (R1) or the second position (R2), the first light emitter (111) emits light of the first original luminous flux or the first luminous flux, respectively.

Figure 7:
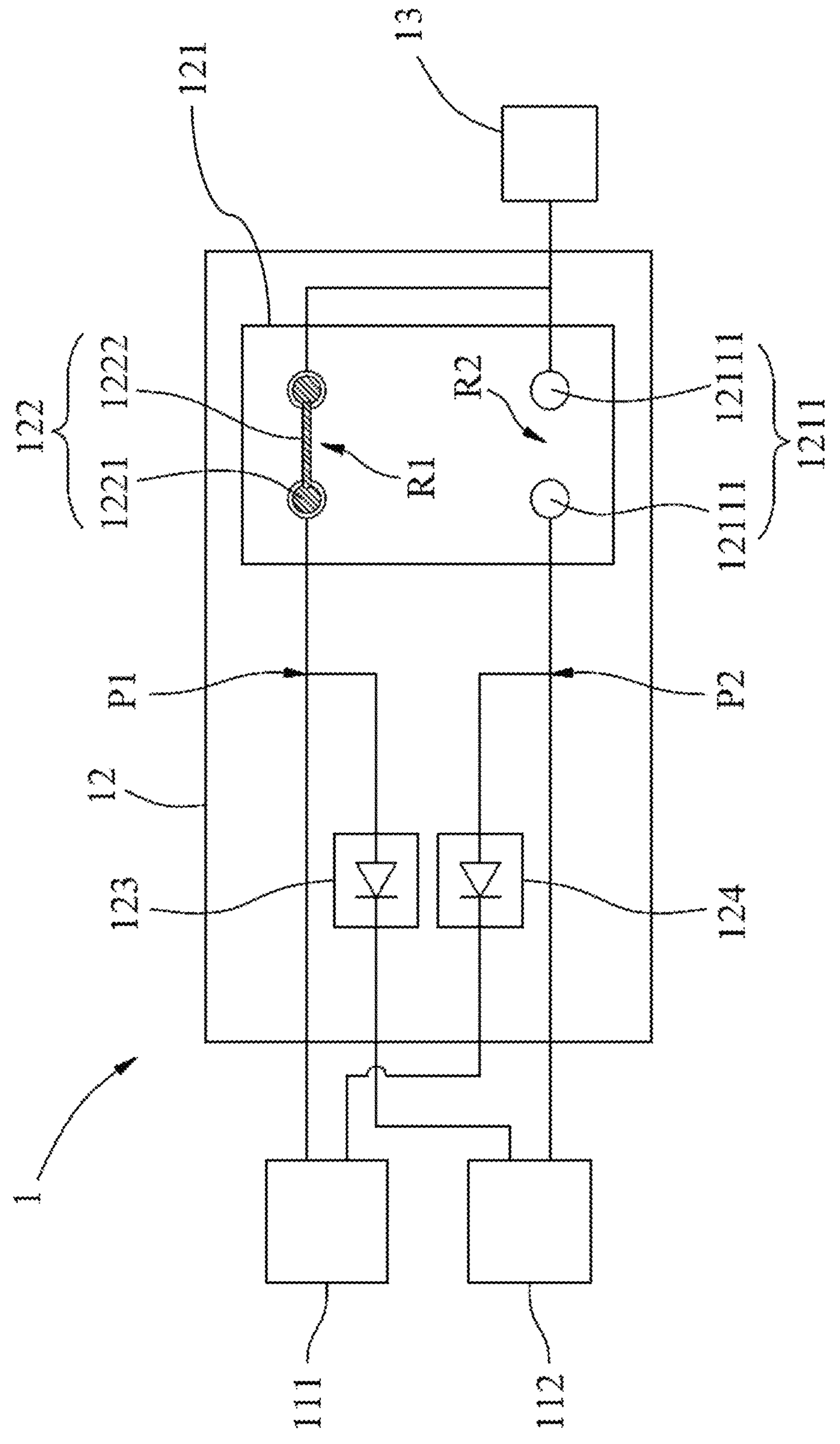
FIG. 7 is a circuit connection diagram of a light emitting device according to yet other one embodiment of the present disclosure.

Refer to FIG. 7, and in such another one specific embodiment, the light emitting device comprises: a first light emitter (111) and a second light emitter (112), the first light emitter (111) and the second light emitter (112) can emit lights of different correlated color temperatures or different wavelengths; and, a control circuit (12) comprising a power distribution device (121), a first voltage regulator (123) and a second voltage regulator (124); wherein, the power distribution device (121) comprises at least two power distribution components (1211), and each of the power distribution components (1211) comprises two independently disposed electrodes (12111); the at least two power distribution components (1211) are respectively a first power distribution component and a second power distribution component, one end of the first voltage regulator (123) (for example, the power input terminal of the diode) is electrically connected to the first power distribution component and the first light emitter (111) via a first voltage drop generation point (P1), and the other end of the first voltage regulator (123) (for example, the power output terminal of the diode) is electrically connected to the second light emitter (112); and one end of the second voltage regulator (124) (for example, the power input end of the diode) is electrically connected to the second power distribution component and the second light emitter (112) via a second voltage drop generation point (P2), and the other end (for example, the power output end of the diode) is electrically connected to the first light emitter (111); and the first voltage regulator (123) and the second voltage regulator (124) are respectively provided with at least one diode. For example, when the jumper (122) is clamped with tweezers and the jumper (122) is set at the first position (R1), the two electrodes of the power distribution component (1211) located at the top (i.e. the first power distribution component) of the two power distribution components (1211) are electrically connected to each other, and the supply current transmitted by the power supplier (13) will be divided into the first divided current and the second divided current at the first voltage drop generation point (P1). The first divided current with the supply voltage directly transmitted to the first light emitter (111), so that the first light emitter (111) emits a light with a CCT of 5000K and a first luminous flux less than the first original luminous flux. After the second divided current passes through the diode of the first voltage regulator (123), there is a voltage drop of the diode (i.e. one voltage drop is generated between the first voltage drop generation point (P1) and the first voltage regulator (123)), and the voltage after the voltage drop is transferred to the second light emitter (112) and the current passing through the second light emitter (112) is less than that without voltage drop, so that the second light emitter (112) emits a light with a CCT of 3000K and a second luminous flux less than the second original luminous flux. For example, the supply voltage has a voltage drop of about 5%, at this time, the luminous flux has a steep drop of about one-half of that of the non-voltage drop, and the second luminous flux is less than the second original luminous flux. Therefore, the light of the first luminous flux of the first light emitter (111) and the light of the second luminous flux of the second light emitter (112) are mixed into a mixed light with a first mixed CCT and the total luminous flux of the aforementioned first luminous flux and the aforementioned second luminous flux.

Still refer to FIG. 7, and for example, when the jumper (122) is clamped with tweezers and the jumper (122) is set in the second position (R2), the two electrodes of the power distribution component (1211) located bottom (the second power distribution component) of the two power distribution components (1211) are electrically connected to each other, and the supply current transmitted by the power supplier (13) will be at the second voltage drop generation point (P2) divided into a third divided current and a fourth divided current. The third divided current with the supply voltage directly transmitted to the second light emitter (112), so that the second light emitter (111) emits a light with a CCT of 3000K and a third luminous flux less than the second original luminous flux. After the fourth divided current passes through the diode of the second voltage regulator (124), there is a voltage drop of the diode (another one voltage drop is generated between the second voltage drop generation point (P2) and the second voltage regulator (124)), and the voltage after the voltage drop is transferred to the first light emitter (111) and the current passing through the first light emitter (111) is less than that without voltage drop, so that the first light emitter (111) emits a light with a CCT of 5000K and a fourth luminous flux less than the first original luminous flux. For example, the supply voltage has a voltage drop of about 5%, at this time, the luminous flux has a steep drop of about one-half of that of the non-voltage drop, and the fourth luminous flux is less than the first original luminous flux. Therefore, the light of the fourth luminous flux of the first light emitter (111) and the light of the third luminous flux of the second light emitter (112) are mixed into a mixed light with a second mixed CCT and the total luminous flux of the aforementioned third luminous flux and the aforementioned fourth luminous flux.

Please refer to FIG. 1 and FIG. 2 together again. The mask (21) can cover the light emitter (11) and circuit board (14) to protect the light emitter (11) from damage. At least a part of the mask (21) is made of a transparent material, so that the light emitted by the light emitter (11) can pass through the mask (21). In addition, the shape of the mask (21) can be determined according to the shape of the circuit board (14). In a preferred embodiment of the present disclosure, the shape of the circuit board (14) is rectangular, and the shape of the mask (21) is a rectangular shell.

Figure 8:
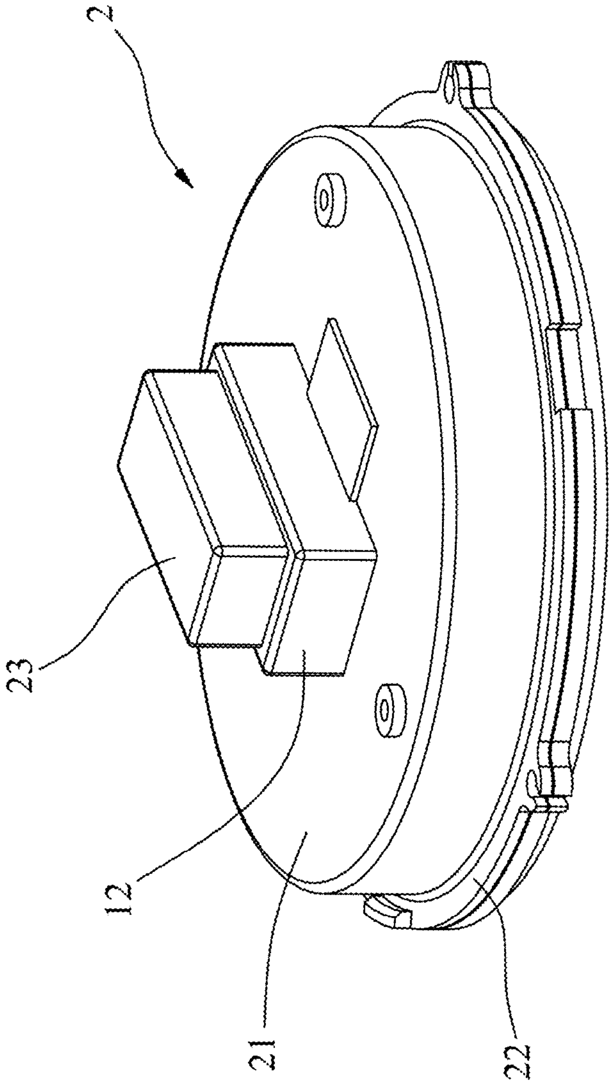
FIG. 8 is a three-dimensional view of an overall structure of a lamp assembly according to another one embodiment of the present disclosure.

Furthermore, the hollow plate (22) is arranged around the mask (21), and the hollow plate (22) uses a plurality of fixing parts (221) to make the light emitting device (1) fixed on a wall (not shown in the drawing), the wall can be, for example, but not limited to a ceiling, the hollow plate (22) can contact the ceiling, and is fixed to the cavity of the ceiling (not shown in the drawings) by the fixing part (221). The control circuit (12) is arranged in the cavity of the ceiling, and the light emitter (11) is arranged on and outside the ceiling relative to the control circuit (12), so as to brighten the space that needs light. In addition, the shape of the hollow plate (22) is determined according to the shape of the mask (21). In a preferred embodiment of the present disclosure, the shape of the mask (21) is a rectangular shell, and the shape of the hollow plate (22) is a rectangular shape. Please also refer to FIG. 8, which is a three-dimensional schematic diagram of the overall structure of the lamp assembly according to another one embodiment of the present disclosure. The mask (21) is cylindrical, and the hollow plate (22) is also in a shape of circle. However, it must be noted that the above-mentioned shapes of the circuit board (14), mask (21) and hollow plate (22) are for the convenience of description, and are not limited to the present disclosure, and those skilled in the art should know that the shapes of different circuit board (14), mask (21) and hollow plate (22) are only the difference in appearance of the lamp assembly (2), and will not affect the actual implementation of the present disclosure.

It is of course to be understood that the embodiments described herein is merely illustrative of the principles of the disclosure and that a wide variety of modifications thereto may be effected by persons skilled in the art without departing from the spirit and scope of the disclosure as set forth in the following claims.

What is claimed is:

1. A light emitting device, comprising:

a first light emitter and a second light emitter, wherein the first light emitter and the second light emitter emit lights with different color temperatures or different wavelength; and a control circuit, comprising a power distribution device and a first voltage regulator; wherein the power distribution device comprises at least two power distribution components, and each of the power distribution components comprises two electrodes disposed independently; the at least two power distribution components are respectively a first power distribution component and a second power distribution component, the first power distribution component is electrically connected to the first light emitter, a power input end of the first voltage regulator is electrically connected to the first power distribution component via a first voltage drop generation point, and a power output end of the first voltage regulator is electrically connected to the second light emitter;

wherein the second power distribution component is electrically connected to second light emitter, and the first voltage regulator has at least one diode disposed therein;

wherein the light emitting device further comprises a jumper, when the two electrodes of the first power distribution component are electrically connected to each other via the jumper, a supply current of a power provided by a power supplier is divided at the first voltage drop generation point into a first divided current and a second divided current, wherein the first divided current directly flows into the first light emitter to make the first light emitter emit a first luminous flux, and after the second divided current passes the first voltage regulator, one voltage drop is generated between the first voltage drop generation point and the first voltage regulator, and the second divided current to make the second light emitter emit a second luminous flux; wherein the first luminous flux of the first light emitter and the second luminous flux of the second light emitter are mixed to form a first mixed correlated color temperature (CCT).

2. A lamp assembly, comprising:

the light emitting device of claim 1;

a mask, wherein the mask masks the light emitting device.

3. A light emitting device, comprising:

a first light emitter and a second light emitter, wherein the first light emitter and the second light emitter emit lights with different color temperatures or different wavelength; and a control circuit, comprising a power distribution device and a first voltage regulator; wherein the power distribution device comprises at least two power distribution components, and each of the power distribution components comprises two electrodes disposed independently; the at least two power distribution components are respectively a first power distribution component and a second power distribution component, the first power distribution component is electrically connected to the first light emitter, a power input end of the first voltage regulator is electrically connected to the first power distribution component via a first voltage drop generation point, and a power output end of the first voltage regulator is electrically connected to the second light emitter;

wherein the second power distribution component is electrically connected to second light emitter, and the first voltage regulator has at least one diode disposed therein;

wherein the control circuit further comprises a second voltage regulator, a power input end of the second voltage regulator is electrically connected to the second power distribution component via a second voltage drop generation point, a power output end of the second voltage regulator is electrically connected to the first light emitter, the second power distribution component is electrically connected to the second light emitter, and the second voltage regulator has at least one diode disposed therein;

wherein when the two electrodes of the second power distribution component are electrically connected to each other via a jumper, the supply current of the power provided by a power supplier is divided at the second voltage drop generation point into a third divided current and a fourth divided current, wherein the third divided current directly flows into the second light emitter to make the second light emitter emit a third luminous flux, and after the fourth divided current passes the second voltage regulator, another one voltage drop is generated between the second voltage drop generation point and the second voltage regulator, the fourth divided current to make the first light emitter emit a fourth luminous flux; wherein the fourth luminous flux of the first light emitter and the third luminous flux of the second light emitter are mixed to form a second mixed correlated color temperature (CCT), and the first mixed CCT is different from the second mixed CCT.

* * * * *